United States Patent
Strople et al.

[15] 3,672,129
[45] June 27, 1972

[54] APPARATUS FOR DISPENSING STERILE GAS

[72] Inventors: Gordon N. Strople, Cherry Hill; Justin W. Mills, Jr., Cinnaminson, both of N.J.

[73] Assignee: Lif-O-Gen, Inc., Lumberton, N.J.

[22] Filed: March 20, 1970

[21] Appl. No.: 21,242

[52] U.S. Cl.................................55/270, 55/274, 55/279, 55/323, 55/356, 55/417, 55/503, 55/DIG. 17, 128/185
[51] Int. Cl..................................B01d 53/30
[58] Field of Search..................55/270, 274, 279, 323, 350, 55/356–358, 410, 417–418, 501, 503, 518, 519; 128/185; 23/281; 21/DIG. 4; 99/49, 79; 261/DIG. 7

[56] References Cited

UNITED STATES PATENTS

| | | | |
|---|---|---|---|
| 3,441,020 | 4/1969 | Wortz et al. | 128/146.4 |
| 3,190,287 | 6/1965 | Miller | 128/191 R |
| 2,550,810 | 5/1951 | Heidbrink | 55/279 UX |
| 3,024,655 | 3/1962 | Dwyer et al. | 55/274 UX |
| 3,176,448 | 4/1965 | Omohundro | 55/279 |
| 3,351,052 | 11/1967 | Hewson | 137/87 X |
| 3,357,162 | 12/1967 | Doig | 55/274 X |
| 3,520,416 | 7/1970 | Keedwell | 55/528 X |
| 2,789,654 | 4/1957 | Zurit | 55/417 X |
| 2,553,763 | 5/1951 | Hammon | 55/518 X |
| 3,176,447 | 5/1965 | Omohundro et al. | 55/279 |

*Primary Examiner*—Tim R. Miles
*Assistant Examiner*—Vincent Gifford
*Attorney*—Howson and Howson

[57] ABSTRACT

A portable unit for sterilizing gas to cleanse it of foreign bodies, especially living microorganisms, comprising a portable frame supporting a sub-micron filter through which the gas is passed when connected between a gas source and gas utilization apparatus, for example between an oxygen source and an oxygen mask for a patient. A pressure gauge monitors the pressure developed across the sub-micron filter and is preferably calibrated in terms of filtration efficiency to provide an indication of when the filter has reached a condition for which it should be replaced. The sub-micron filter is preceded by a pressure regulator which receives gas under high pressure from a contaminated source, reduces it to a working pressure, and supplies it to the sub-micron filter at a fixed predetermined pressure value. Preferably also employed are an inlet pressure gauge for measuring the pressure of the gas supplied from the source to the pressure regulator and a flow meter and flow control through which the gas passes before it is delivered to the outlet connection to the gas utilization apparatus. In this way gas from a bulk source or an unsterilized container is rendered sterile by connection thereto of the portable gas sterilizer. The visual monitoring of the condition of the filter insures proper maintenance by replacement of the filter when needed.

6 Claims, 4 Drawing Figures

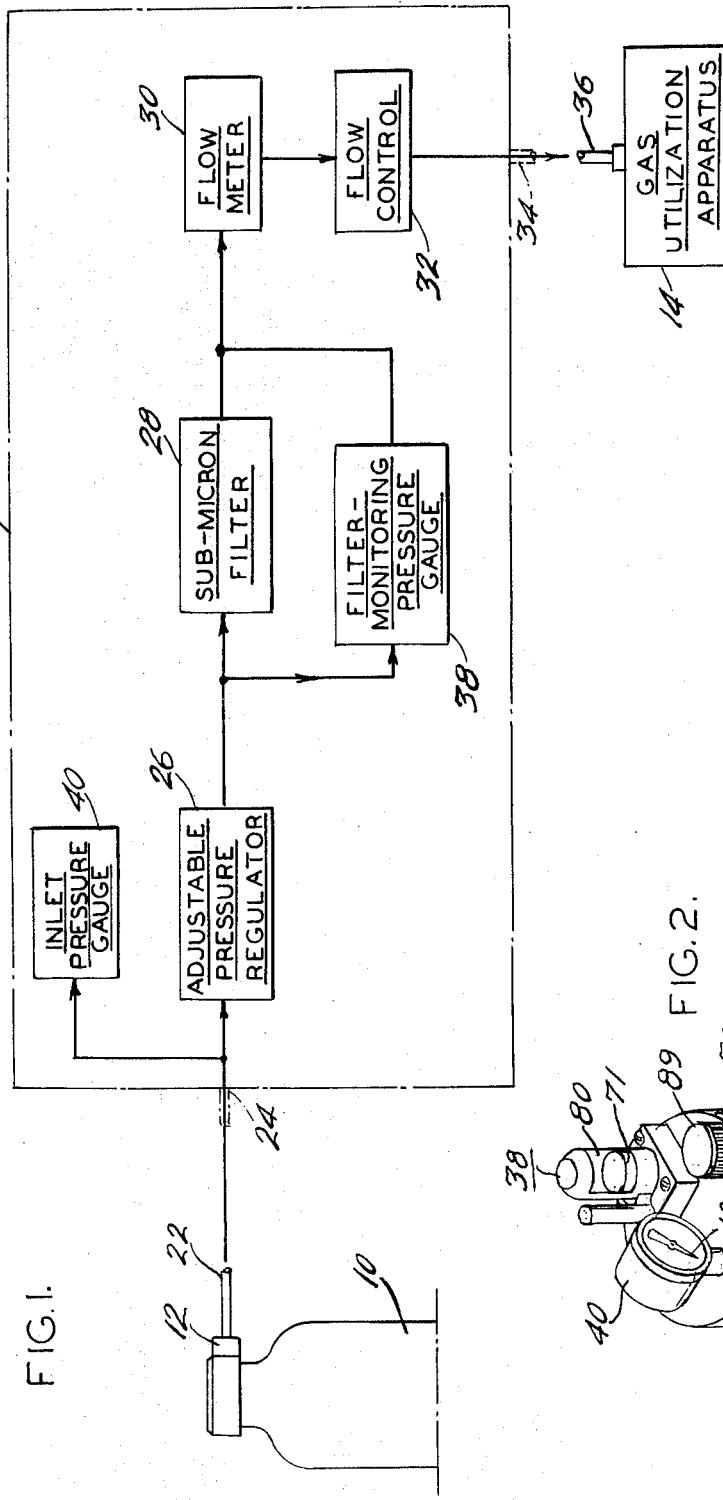
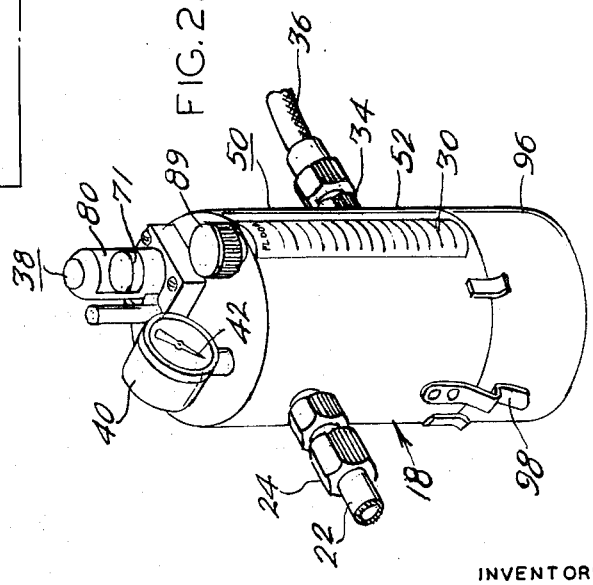

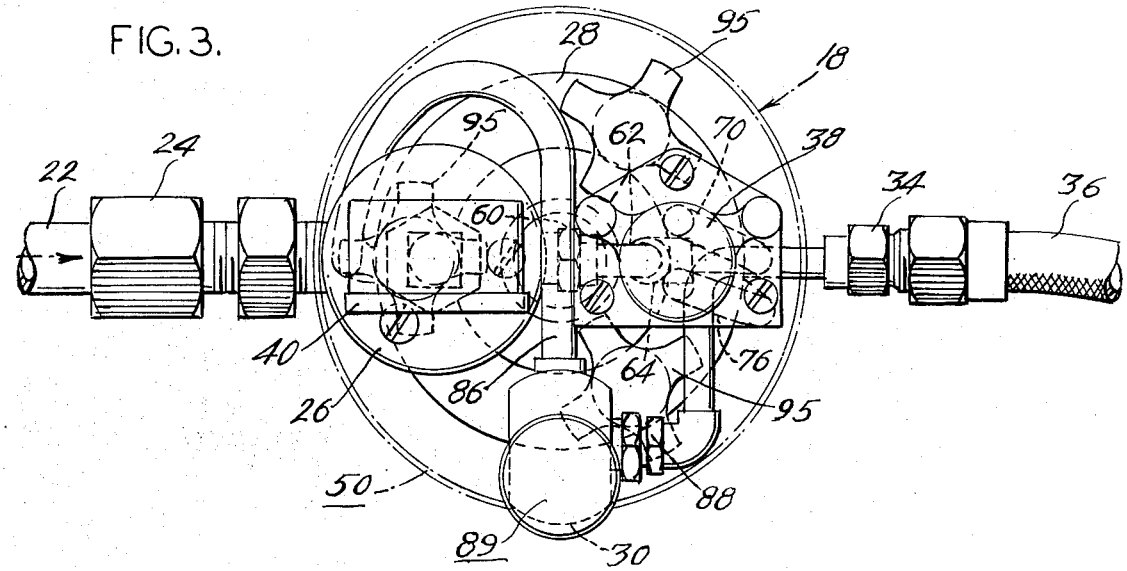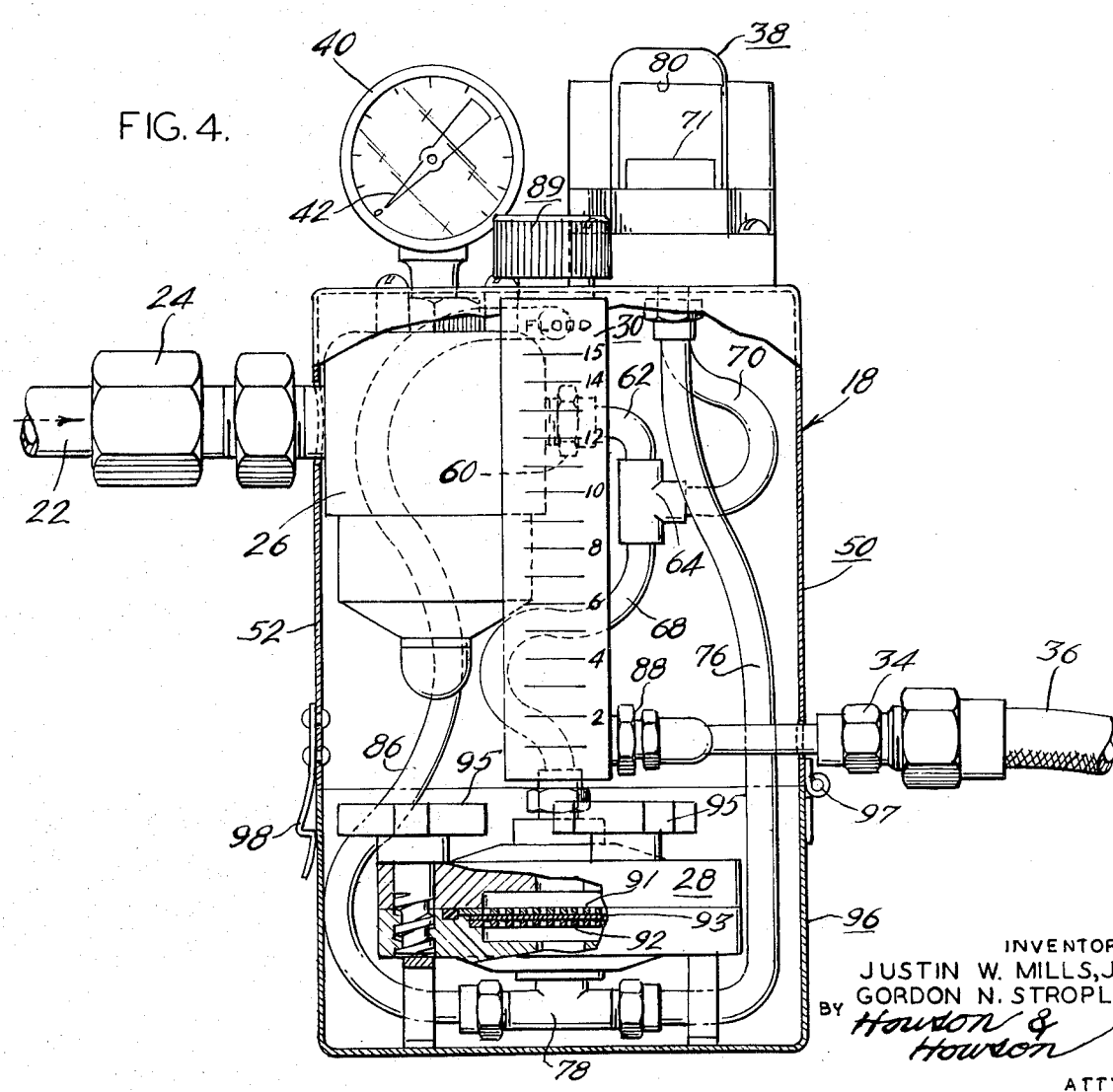

APPARATUS FOR DISPENSING STERILE GAS

BACKGROUND OF THE INVENTION

There are a variety of applications in which it is desired to be able to supply clean, sterile gas to some utilization apparatus. For example, it may be desired to supply sterile oxygen, uncontaminated by living microorganisms, to an oxygen mask for therapeutic use by a patient. In certain laboratory operations it may be highly important to remove such small organisms from a gas which otherwise would produce biological contamination. In many other situations, for example in the fabrication of sensitive semi-conductor devices, it may be very important to remove even very fine particles of contaminants of non-living material. In addition to oxygen, other common materials in which such requirements for extreme cleanliness typically arises include air, nitrogen, cyclopropane, nitrous oxide, carbon dioxide and helium, as examples.

The copending application Ser. No. 765,044 of Gordon N. Strople and Justin W. Mills, Jr., filed Oct. 4, 1968, now abandoned, and entitled Method and Apparatus for Sterilizing Gas Containers and Filling Same With A Sterile Gas and of common assignee herewith, describes one possible approach to providing such a sterile supply of gas. According to the latter application, a manufacturing process is provided by which gas containers can be sterilized and charged with sterilized gas products, after which they may be packaged for shipment, ready for use, in a sterile packaged filled with a sterilizing agent. When it is desired to utilize the sterile gas, the equipment is removed from the package and is in condition to provide the necessary clean gas supply.

However, there are many situations in which this approach is not entirely satisfactory. For example, the facility at which the need for the sterile gas arises may already be piped with bulk gas, or may have gas in standard containers readily available, in either of which cases, from the viewpoint of economics and convenience, it would be desirable to make use of the gas already available at the facility rather than to import a new supply of sterile gas for the particular required use.

Accordingly it is an object of the invention to provide a new and useful apparatus for providing a supply of sterile gas.

A further object is to provide such apparatus which makes use of existing supplies of gas, whether in standard containers or in supply pipes.

It is also an object to provide such apparatus which is readily adaptable for use in different locations and in connection with different sources of gas.

Another object is to provide such apparatus which provides convenient indications of servicing requirements thereof.

It is also an object to provide such a method and apparatus which is readily portable, and is convenient and compact.

It is also an object to provide such apparatus which itself can be readily sterilized, and which provides control and monitoring of gas pressures and flow rates.

SUMMARY OF THE INVENTION

These and other objects of the invention are achieved by the provision of apparatus by means of which gas from a contaminated source is supplied to gas utilization apparatus by way of a sterilizing dispenser including a submicron filter, through which filter the gas is passed when the unit is connected between the source and the utilization device. Filter monitoring means are associated with the sub-micron filter for providing continuous visual indications of the operating condition of the filtering means, whereby when it becomes inefficient due for example to clogging, such condition will be indicated and the operator warned to replace the filter means with a fresh filtering element. Preferably also employed are a pressure regulator for receiving the impure gas through the inlet means and supplying it to the sub-micron filter at a substantially reduced pressure; an inlet pressure gauge for measuring the pressure at the inlet to provide indications of the contents of a gas source, particularly where the latter source is a container of gas; and flow metering and flow control means for controlling the rate of flow of the gas to the gas utilization device, and for providing simultaneous indication of the rate of such flow.

With such apparatus, for example, a piping system for unsterilized oxygen may be provided in hospital rooms and a portable unit, itself sterilized and constructed in accordance with the invention, may be connected between the outlet of the piping and a patient's oxygen mask to supply the patient with a controlled rate of flow of sterilized oxygen. Similarly, where impure of unsterilized oxygen is available in containers in a hospital, one such standard container may be installed in a patient's room and a portable sterilizer constructed in accordance with the invention connected between the output of the standard container and the patient's oxygen mask. Also, in a laboratory where nitrogen is to be utilized as an inert atmosphere in certain experiments or in actual manufacturing, for example, a sterilizing unit in accordance with the invention may be inserted between the impure source of such nitrogen and the point at which the gas is to be put into use, to assure a completely uncontaminated supply of the gas. Many other applications will occur to one skilled in the art.

BRIEF DESCRIPTION OF FIGURES

These and other objects and features of the invention will be more readily understood from a consideration of the following detailed description taken in connection with the accompanying drawings, in which:

FIG. 1 is a schematic block diagram illustrating a system in accordance with the invention in one of its possible uses;

FIG. 2 is a perspective view of one form of physical embodiment of a portable unit in accordance with the invention;

FIG. 3 is a plan view of the apparatus of FIG. 2 with the outer container shown in phantom for greater clarity; and FIG. 4 is an elevational view, with the casing broken away in part, to show the interior construction of the apparatus of FIG. 2 and 3.

DESCRIPTION OF SPECIFIC EMBODIMENTS

Referring now by way of example only to the particular arrangements and embodiments of the invention shown in the drawings by way of example only, FIG. 1 illustrates an application in which a standard gas cylinder 10 containing an unsterilized pressurized gas, such as oxygen, is provided with a manually controllable outlet valve 12, gas from which is to be supplied to gas utilization apparatus 14, which may for example comprise an oxygen mask for a medical patient. It is assumed that, due to the presence of living organisms such as bacteria and/or non-living material in the gas in container 10, direct delivery of the gas from the container to the gas utilization apparatus 14 would be undesirable because of the possible effects of such organisms or other impurities upon the patient using the mask. In accordance with the invention, the portable sterile gas dispenser 18 is connected between the outlet valve 12 of the standard gas cylinder and the gas utilization apparatus 14 to provide the desired supply of sterilized gas to the latter apparatus.

The parts of the sterile gas dispenser 18 shown in FIG. 1 are designated by corresponding numerals in the physical embodiment of the invention shown in FIGS. 2–4. In general, the flexible gas line 22 from the outlet valve 12 of the standard gas container 10 is connected to the inlet connector 24 for the sterile gas dispenser 18. The latter connector 24 may include a primary filter consisting of a relatively coarse filter such as may be provided by a 10-micron metal mesh, in order to screen out any large scale foreign bodies or impurities which may happen to be present in the gas traversing line 22. Within the dispenser 18, the gas is supplied through the adjustable pressure regulator 26 to a sub-micron filter 28, and thence through a flow meter 30 and a flow control arrangement 32 integral with the flow meter to the outlet connector 34 of the dispenser, from which a flexible outlet line 36 supplies a sterilized gas to the gas utilization apparatus 14.

In parallel with the sub-micron filter 28 there is connected the filter-monitoring pressure gauge 38 which continuously provides an indication of the gas-pressure differential between opposite sides of the filter, for reasons described in more detail hereinafter. Also preferably employed is an inlet pressure gauge 40 connected to the inlet of the pressure regulator 26, which in the application illustrated effectively provides a reading of the pressure of the gas in the standard container 10, and thereby also provides an indication of the gas content of the container. Pressure regulator 26 receives the inlet gas under the pressure established by the pressure in container 10, and supplies sub-micron filter 28 with a reduced, substantially fixed pressure typically of the order of about 50 psi.

In the physical embodiment of the invention illustrated in FIGS. 2–4, and in which numerals corresponding to those in FIG. 1 represent corresponding parts, the apparatus is shown as a portable unit comprising a frame 50 having an outer cylindrical casing 52 on which the inlet and outlet connectors 24 and 34 are mounted in conventional manner. The inlet connector 24 delivers gas directly to the inlet pressure gauge 40, which is mounted above the top of the frame 50 and comprises an angularly deflectable needle 42 the position of which indicates the inlet gas pressure. The pressure regulator 26, as shown in FIGS. 3 and 4, is mounted just below the top of the cylindrical casing 52. The outlet 60 of the regulator is connected by flexible tubing 62 and T-connector 64 to one side of the sub-micron filter 28 and to one side of the filter-monitoring pressure gauge 38, by means of flexible connectors 68 and 70 respectively.

The filter-monitoring pressure gauge 38 may consist of a commercially available type in which a piston 71 thereof moves upwardly in proportion to the differential in pressure between its inlet and outlet connectors. Flexible line 70 is connected to the inlet connector of the gauge, and the outlet connector is connected to the flexible line 76 and thence to the opposite side of the sub-micron filter 28 by way of the T-connector 78. Accordingly, the extent to which the piston 71 of the gauge 38 rises upwardly is in proportion to the pressure developed across the sub-micron filter 28 by the flow of gas through it.

Piston 71 is rendered visible by means of a transparent window 80, and indicia or color ranges may be provided on or adjacent the window to provide the viewer with an indication of when the pressure across the sub-micron filter is of a low, medium or high value. When the filter is new, the pressure across it will be lowest, but as it begins to accumulate contaminants in its pores the pressure across it will rise into the region of medium pressure, and finally into the region of relatively high pressure, at which time the filter should be replaced since it is no longer efficient in performing its intended task of removing microbes and very fine impurities from the gas and, in addition, is preventing the desired relatively free flow of gas through it.

The flow meter 30 is also of conventional form and is mounted generally below the top surface of the cylindrical casing 52 with its calibrated scale visible through the side cylindrical surface of the frame. Gas flow to the flow meter is provided from T-connector 78 by way of flexible line 86, and the outlet 88 of the flow meter is connected directly to the outlet connector 34 of the sterile gas dispenser. The flow control 89 consists in this embodiment of a rotatable knob, connected by a shaft to a suitable flow control arrangement, not shown in detail since the apparatus is well-known and commercially available.

In operation, the sterile gas dispenser 18 is constructed and mounted as shown, and is preferably sterilized and shipped in a package containing a sterilizing gas atmosphere to the location at which it is to be used. When the equipment is removed from its sterile package, the outlet connector 34 thereof is connected to the utilization device, such as an oxygen mask for example. The inlet connector 24 is connected to a source of gas, which as mentioned above may be standard gas piping or a standard gas container. The gas source will then be turned on, and the inlet pressure gauge 40 will indicate directly the pressure of the gas from the source, providing continuous monitoring thereof. This is of particular interest where the source of gas is a standard cylinder in which the amount of gas in the cylinder is constantly being depleted, the inlet pressure serving as an indication of the contents of the container to provide immediate information as to how much gas remains and whether, for example, another container of gas will be required in the near future. The gas then flows through the pressure regulator 26, wherein the pressure is reduced to the desired delivery level, typically about 50 psi. The gas then flows through the sub-micron filter 28, containing pores of sub-micron size, which will remove microscopic living organisms from the gas stream, together with any remaining non-living impurity particles of small size. The filter-monitoring pressure gauge 38 meanwhile monitors the differential pressure across the sub-micron filter; the operator is preferably provided with maintenance instructions directing him to replace the filter with a new one if the pressure differential indicated by gauge 38 rises above a predetermined level. The flow control knob 89 is adjusted to provide the rate of flow desired for the particular application, as indicated by the flow meter 30.

The particular form of sub-micron filter utilized in the present example can be seen in FIG. 4. It will be seen that the filter comprises two opposed ceramic disks 91 and 92 having coarse holes through them, between which the sub-micron filter element 93 is clamped by means of the three clamping knobs 95, which can be loosened to remove the filter element.

In order to enable convenient changing of the filter, a portion 96 of the generally cylindrical supporting frame 50 located below the outlet connector 34 is hingedly connected at 97 to the upper portion thereof, and normally held in the closed position shown by means of an appropriate latching arrangement 98. When, as indicated by a relatively high pressure reading on the filter monitoring pressure gauge 38, it is time to change the sub-micron filter, the entire unit is preferably disconnected from service and, if required, replaced temporarily with a substitute unit; the removed unit is then opened by dropping the lower hinged portion of the container, thereby to expose completely the sub-micron filter and its three clamping knobs. By loosening the clamping knobs and opening the filter housing, the filter element 93 is easily replaced. This procedure is preferably accomplished in such a way as to assure resterilization of the interior surfaces of the filter, which may be accomplished by gas sterilization, ultrasonics or ultraviolet as examples. Such techniques are well known in the art and hence need not be described here in detail. Suffice it to indicate that, after sterilization, the unit is reassembled, the hinged bottom closed again, and the unit placed back into service when required.

Accordingly, there has been provided a unit, preferably easily portable, which can readily be connected and disconnected to provide sterilization of gas from an unsterile gas source, to provide monitoring of the inlet pressure and the outlet gas flow rate, and at the same time to indicate visually when a condition has been reached in which the sub-micron filter should be replaced. In this way, a supply of sterilized gas is made possible in facilities in which piping of bulk, unsterilized gas, or quantities of unsterilized gas in standard containers, are available.

While the invention has been described in the interest of definiteness with particular regard to specific embodiments thereof, it will be understood that it may be embodied in a variety of ways diverse from those specifically shown and described without departing from the invention.

What is claimed is:

1. Apparatus for sterilizing a flow of gas from a source of gas to a gas utilization means comprising:
   gas inlet means detachably connectable to said gas source to receive gas from said source when connected thereto;
   adjustable pressure regulator means supplied with said gas from said source, said pressure regulator means having an outlet, said pressure regulating means being operable for producing a substantially fixed pressure of said gas at the outlet of said regulator means;

pressure measuring means connected to said inlet means for indicating the pressure of said gas at said inlet means;

sub-micron filter means supplied with said gas from said regulator means for filtering from said gas foreign-body particles of sub-micron size, said filter means having a pore size operable to remove all living microorganisms from said gas to thereby sterilize said gas, said sub-micron filter means being readily removable and replaceable;

flow control means supplied with said gas from said sub-micron filter means for enabling adjustment of the volume rate of flow of said gas therethrough;

flow metering means for measuring the volume rate of flow of said gas through said flow control means;

gas outlet means detachably connectable to gas utilization means, for supplying said gas from said flow metering means to said utilization means when connected thereto;

filter monitoring means operatively associated with said sub-micron filter means for providing indications of the operating condition of said sub-micron filter means; and portable frame means mounting and supporting said gas inlet means, said pressure regulator means, said pressure measuring means, said sub-micron filter means, said filter monitoring means, said flow control means, said flow metering means, and said gas outlet means as an integral portable unit, whereby said inlet means and said outlet means may be readily connected to different gas sources and different gas utilization means respectively.

2. The apparatus of claim 1, wherein said filter monitoring means associated with said filter means provides visual indications of the operating condition of said filter means, and means mounting said filter means for ready removal and replacement whereby said filter means may be replaced when said filter monitoring means indicates that said filter means is no longer operating adequately.

3. The apparatus of claim 2, in which said filter monitoring means comprises means for continuously sensing the gas pressure drop across said filter means and means visually indicating the magnitude of said pressure drop.

4. The apparatus of claim 3, in which said mounting means comprises a pair of opposed multiply-apertured plates, one on each side of said filter means, and releasable clamping means for clamping said plates together with said filter means between them.

5. The apparatus of claim 2 wherein said pressure measuring means provides a visual indication of the magnitude of the gas pressure at said inlet means.

6. The apparatus of claim 2 wherein said flow metering means provides visual indications of the rate of flow of gas from said outlet means.

* * * * *